April 14, 1936.  J. G. JACKSON  2,037,632
METER TEST BLOCK
Filed Dec. 11, 1933   2 Sheets-Sheet 1
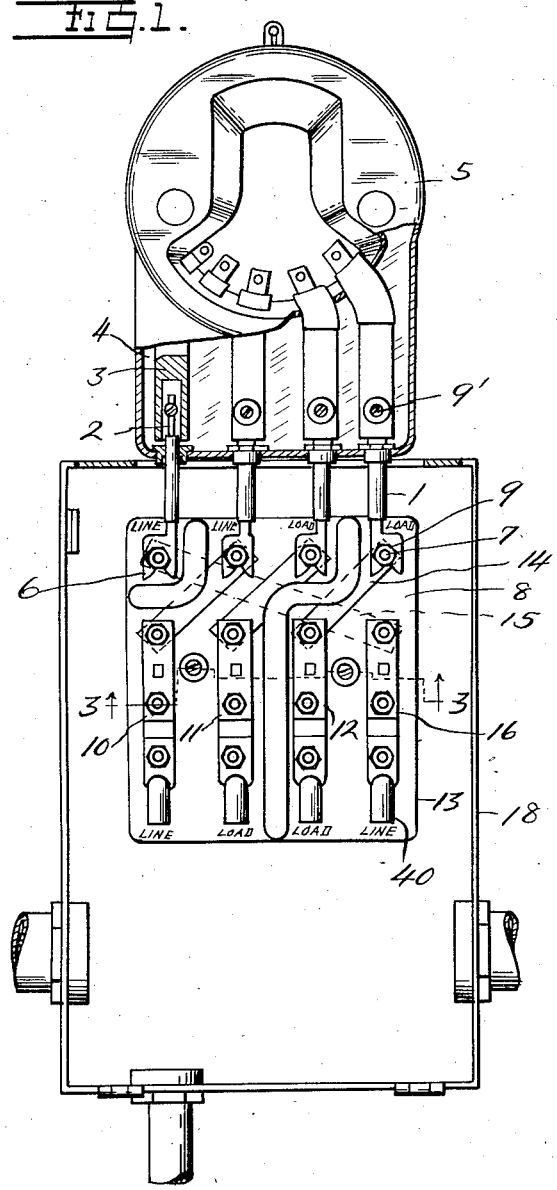
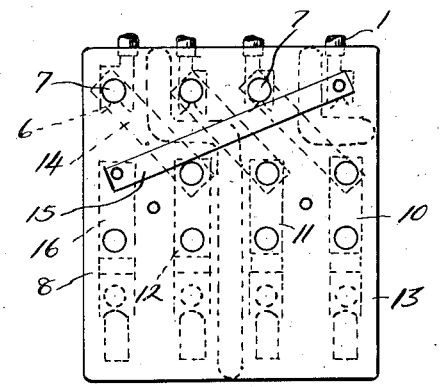
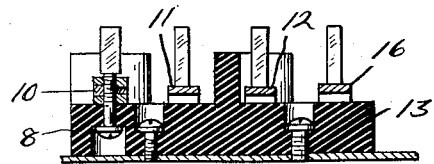
INVENTOR
John G. Jackson
BY
ATTORNEYS April 14, 1936.  J. G. JACKSON  2,037,632
METER TEST BLOCK
Filed Dec. 11, 1933  2 Sheets-Sheet 2
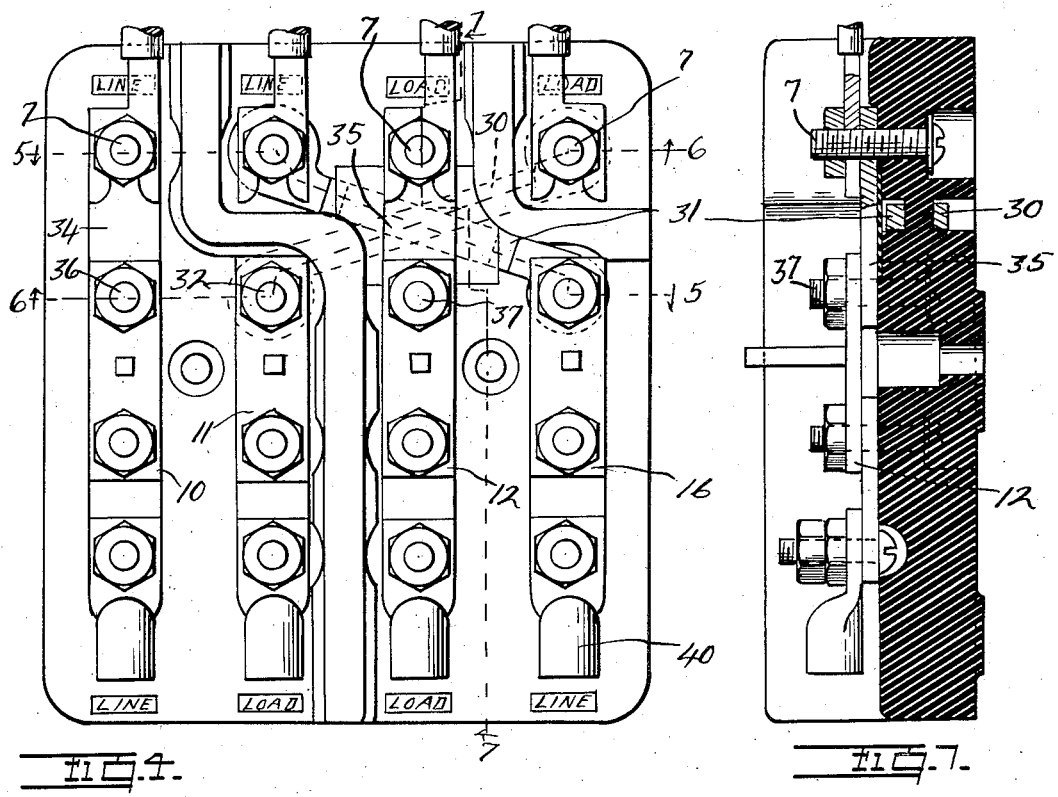
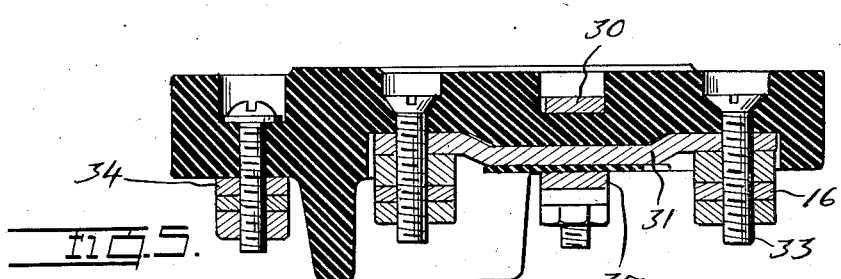
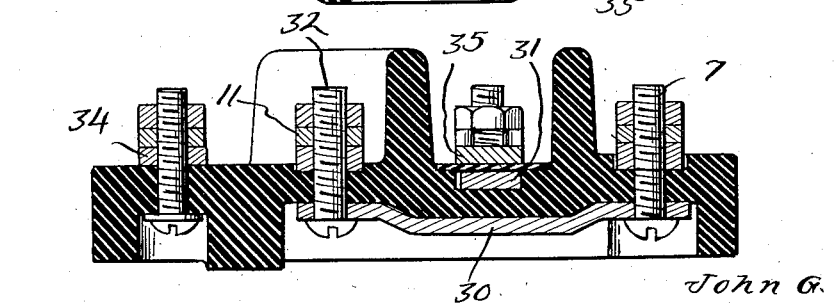
INVENTOR
John G. Jackson
BY
ATTORNEYS Patented Apr. 14, 1936

2,037,632

UNITED STATES PATENT OFFICE 2,037,632

METER TEST BLOCK

John G. Jackson, Detroit, Mich., assignor to Square D Company, Detroit, Mich., a corporation of Michigan Application December 11, 1933, Serial No. 701,930

12 Claims. (Cl. 175—183)

This invention relates generally to service entrance equipment and refers more particularly to electric meter test blocks.

This application is a continuation in part of an application for patent filed July 22, 1931, bearing Serial No. 552,504, now Patent No. 2,006,768, issued July 2, 1935.

In the accompanying drawings:

Figure 1 is a front elevation of equipment embodying my invention, and showing parts broken away and in section;

Figure 2 is a rear elevation of the test block;

Figure 3 is a sectional view taken on the line 3—3 of Figure 1;

Figure 4 is a plan view of a slight modification;

Figure 5 is a sectional view taken on the line 5—5 of Figure 4;

Figure 6 is a sectional view taken on the line 6—6 of Figure 4;

Figure 7 is a sectional view taken on the line 7—7 of Figure 4.

Heretofore it has been customary to have strap type meter test blocks with parallel sets of connections including a removable strap or an openable link, such test block connections being connected at their upper ends to meter terminals by means of lengths of insulated wire, commonly called meter loops. Due to the fact that a difference in the sequence of connections in the meter terminal chamber and in the meter test block has become practically fixed and standard in the art, it is ordinarily necessary in the installation of meter loops to cross over one or more of the conductors to adapt this meter terminal sequence to the desired test block sequence. This, together with other features incidental to the use of meter loop connections of the wire type has rendered it necessary to provide considerable space between the meter terminal chamber and test block terminal to permit proper installation of such meter loops.

I am aware that various meter block connectors of the plug-in type have been proposed in the past, but such arrangements do not provide the proper test sequences of line and load wires and require the crossing or other re-arrangement of the test circuits from that which appears to be most generally accepted as standard in the industry.

In my device I provide a substitute for the usual type of meter loop connection in the form of comparatively short flat and flexible connection links 1 that are provided at one end with substantially straight end portions 2 for insertion into terminals 3 within the terminal chamber 4 of the meter 5 and are provided at their other ends with forked portions 6 for straddling the terminals 7 of the meter test block 8. Suitable nuts 9 threadedly engaging the terminals 7 are used to fasten the forked portions 6 to said terminals while suitable set screws 9' may be used to fasten the end portions 2 within the terminals 3 of the meter.

It will be noted that the connection just referred to is made without increasing the size of the test block and this has been accomplished by inclining to the right from the three left-hand test links 10, 11 and 12 respectively to the three right-hand terminals 7 upon the front face of the insulated base 13 of the test block three of the line and load terminal links 14, and embedding in the back of the block a fourth terminal link 15 that inclines to the left from the test link 16 at the extreme right hand of the base to the terminal 7 at the extreme left of the block, and so locating and spacing the block within its enclosing cabinet 18 that the test block terminals 7 shall be substantially opposite and symmetrically arranged relative to the corresponding meter terminals 3. Thus, due to the arrangement just referred to and the fact that the connectors 1 are formed of relatively soft copper and are inherently flexible, it is possible to accommodate the spacing of the terminals of meters to wider or narrower spacing of terminals of test blocks in a very simple manner.

Moreover, with the arrangement described it is possible to make practically direct connection from the meter terminals to the test block terminals and this not only permits of ready installation of the connectors 1 therebetween, but, as will be evident from the illustration, such arrangement greatly reduces the spacing required between the meter and the test block. In fact, when connectors such as 1 are used, it is not only desirable but necessary to use a test block with cross-over features to secure the relatively opposite positioning of block terminals to meter terminals of the same polarity and sequence.

In Figures 4 to 7, inclusive, I have illustrated a slight modification in which the second and fourth terminal links 30 and 31, respectively, are inclined in crossed relation. In this construction the link 30 is on the back of the block and extends from the terminal 32 for the test link 11 to the terminal 7 at the extreme right of the block, while the link 31 is on the front of the block and extends from the terminal 33 for the test link 16 to the terminal 7 second from the extreme left of the block. The other terminal links 34 and 35 respectively are upon the front face of the block and are in alignment with test links 10 and 12, respectively. As shown, the first terminal link 34 extends from the terminal 36 for the test link 10 to the terminal 7 at the extreme left of the block, while the terminal link 35 extends from the terminal 37 for the test link 12 to the terminal 7 second from the extreme right of the block. Thus, in this and as well as in the construction illustrated in Figure 1, the terminal links are arranged so that I have line, line, load and load terminals 7 at the upper end of the block for connection between links 1 to the meter, and then line, load, load and line test link connectors 40 at the lower end of the block for connection to corresponding circuit wires or conductors (not shown).

What I claim as my invention is:

1. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, separate links connected to the line terminals of the lower row and the line terminals of the upper row, and separate links connected to the load terminals of the lower row and the load terminals of the upper row.

2. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, and means connecting the line and load terminals of the lower row to the line and load terminals of the upper row including oppositely inclined links respectively upon the front and back of the body and disposed in crossed relation to each other.

3. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right, line, line, load and load, the terminals of the lower row being in vertical alignment with the terminals of the upper row but being respectively from left to right line, load, load and line terminals for test links, separate links connected to the line terminals of the lower row and the line terminals of the upper row, and separate links connected to the load terminals of the lower row and the load terminals of the upper row, one of the last mentioned links being disposed in crossed relation to one of the first mentioned links.

4. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, a line terminal of the lower row and a line terminal of the upper row extending through the body, means on the back of the body connecting the line terminals just mentioned, means connecting the other line terminal of the lower row to the other line terminal of the upper row, and means connecting the load terminals of the lower row to the load terminals of the upper row.

5. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, a line terminal of the lower row and a line terminal of the upper row extending through the body, means on the back of the body connecting the line terminals just mentioned, means on the front of the body connecting the other line terminal of the lower row to the other line terminal of the upper row, and means also on the front of the body connecting the load terminals of the lower row to the load terminals of the upper row.

6. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, a line terminal of the lower row and a line terminal of the upper row extending through the body, a link on the back of the body terminally connected to the line terminals just mentioned, links connecting the other line terminal of the lower row to the line terminal of the upper row, and links connecting the load terminals of the lower row to the load terminals of the upper row.

7. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alginment with the terminals of the upper row but being respectively from left to right line, load, load and line terminals for test links, a link connecting the left-hand line terminal of the lower row to the left-hand line terminal of the upper row, a second link connecting the right-hand line terminal of the lower row to the right-hand line terminal of the upper row, a third link disposed in crossed relation to the second link and connecting the left-hand load terminal of the lower row to the right-hand load terminal of the upper row, and a fourth link disposed substantially parallel to the first link and connecting the right-hand load terminal of the lower row to the left-hand load terminal of the upper row.

8. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, and connections between the terminals of the upper and lower rows including crossed links, one of said links being upon the front face of the body, and another of said links being upon the rear face of the body.

9. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, and connections between the terminals of the upper and lower rows including oppositely extending diagonally disposed links respectively upon the front and rear faces of the body.

10. A self-contained meter test block unit comprising a body of insulating material, two rows of terminals upon the front face of said body, said rows extending across the body and disposed one above the other, the terminals of the upper row being adjacent an edge of the body so as to be engaged by meter connectors or leads and being respectively from left to right line, line, load and load, the terminals of the lower row being in vertical alignment with the terminals of the upper row but being respectively from left to right line, load, load and line terminals for test links, terminal links upon the front face of the body and extending diagonally between the three left-hand terminals of the lower row to the three right-hand terminals of the upper row, the extreme left-hand terminal of the upper row and the extreme right-hand terminal of the lower row extending through the body, and a cross-over link upon the back of the body and extending diagonally between the two last mentioned extreme terminals.

11. A self-contained meter test block unit comprising a meter test block structure having terminals at opposite ends thereof arranged in different sequences, and means embodied in the structure for connecting the terminals at one end of said block to the terminals at the other end thereof, said means including meter test, disconnect means for readily interrupting said connections.

12. A self-contained meter test block unit comprising a meter test block structure having terminals at opposite ends thereof arranged in different sequences, and means connecting the terminals at one end of said block to the terminals at the other end thereof including crossed links embodied in said test block structure, and removable links providing meter test facilities.

JOHN G. JACKSON.